Figure 1:
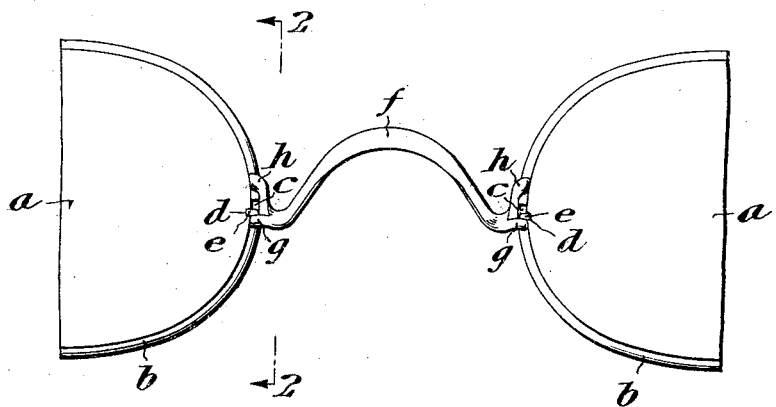
Figure 2:
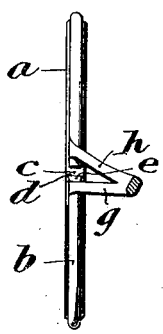

No. 767,809. PATENTED AUG. 16, 1904.
I. FOX.
EYEGLASS FRAME.
APPLICATION FILED MAR. 9, 1903.
NO MODEL.

WITNESSES: INVENTOR:

No. 767,809. Patented August 16, 1904.

UNITED STATES PATENT OFFICE.

IVAN FOX, OF LANSDOWNE, PENNSYLVANIA.

EYEGLASS-FRAME.

SPECIFICATION forming part of Letters Patent No. 767,809, dated August 16, 1904.

Application filed March 9, 1903. Serial No. 146,856. (No model.)

*To all whom it may concern:*

Be it known that I, IVAN FOX, a citizen of the United States, residing at Lansdowne, in the county of Delaware, State of Pennsylvania, have invented certain new and useful Improvements in Eyeglass-Frames, of which the following is a specification.

This invention relates to an improvement in eye glass frames, and its object is to provide rims for the lenses of eye glasses which have ends which are located adjacent to each other at one edge of an inclosed lens, the said rim being provided with means to prevent rotation of the inclosed lens.

The improved eye glass rim is adapted to be used in connection with a nose bridge in which the opposite adjusting arms for connecting the said bridge and the rims are bifurcated, though it will be understood that the said rim may be employed in the construction of eye glass frames in which the nose bridge is of the usual construction.

The improvement resides in the peculiar and novel arrangement herein described and specifically pointed out in the claims.

In the accompanying drawings forming part of this specification,

Figure I is a view in front elevation of a pair of eye glasses in which my invention is embodied;

Figure II is a view of the inner edge of one of the rims of the eye glass frame shown in Figure I, the view being taken along the line 2-2 of the said Figure I.

In the drawings, $a$ designates the eye glass lenses, and $b$ designates the rims for the said lenses. The lenses and the rims are of the usual shape. Each rim may be constructed of a single wire bent to proper form, the respective ends thereof being brought to a position of adjacency, as shown at $c$ in the drawings. It is to be understood, however, that I do not restrict myself to this particular construction, since it is obvious that each rim could be constructed of two separate wires having one end of each connected to an end of the other.

While the adjacent ends of the rims are shown as being located at the inner edges of the lenses adjacent to the respective ends of the bridge, that is, at the inner edge of the major axes of the lenses, it will be understood that the said adjacent ends may be located at the opposite or outer ends of the major axes of the lenses at points adjacent to the temple joints.

The rims are provided with grooves for the reception of the peripheral edges of the lenses in the usual manner.

As illustrated in the drawings, the means provided to prevent rotation of a lens with respect to its inclosing rim consists of a notch $d$ formed in the edge of the lens, which is adapted to receive the hook or projection $e$ formed on one of the adjacent ends of a rim.

$f$ designates the bridge piece consisting of a single band or wire, and which occupies a position between the rims of a pair of glasses and is connected to the said rims to secure them together. The bridge piece is provided at its opposite ends with adjusting arms which are bifurcated to form bifurcations or spring fingers $g$, $h$; and each of the fingers at each end of the bridge piece is connected to the respective adjacent ends of the eye glass rims, as clearly shown in the drawings.

The bifurcations or spring fingers at each end of the spring piece are adapted to be adjusted inwardly and outwardly, that is, from and toward the center of the bridge of the frame, and also to be laterally adjusted, that is, moved toward and from each other, and as the said fingers possess greater or less resiliency and elasticity, their tendency is after having been moved, to return to their original or normal position.

It will be seen that if the fingers are moved slightly further apart than is normal, and the lenses placed within the rims, the latter will be clamped round and firmly secured about the said lenses.

One advantage of a construction such as is herein disclosed, is that it permits of the use of lenses of slightly different sizes by reason of the fact that the distance between the adjacent ends of the rims may be slightly increased or diminished.

It is obvious that the construction herein illustrated and described affords means by which the lenses may be most readily displaced from the rims or placed in position within the rims, as desired, and also affords means by which the said lenses are retained in the exact position desired relatively to the said rims.

Having thus described my invention, I claim—

1. The combination of a pair of eye glass lenses, each lens having a notch in its inner edge, eye glass frames comprising rims, each rim having free ends adjacent to each other and located at the inner edge of the rim, a hook terminating one of the said free ends of each of the said rims and adapted to enter said notch, and a bridge piece connecting the said rims.

2. The combination of a pair of eye glass lenses, eye glass frames comprising rims for the lenses, each of the said rims having free ends located adjacent to each other, and means secured to the rims and adapted to engage the said lenses and prevent rotation thereof with respect to the rims.

3. The combination of a pair of eye glass lenses, each lens having a notch in its inner edge, eye glass frames comprising rims, each rim having free ends adjacent to each other and located at the inner edge of its inclosed lens, a projection terminating one of the free ends of each of the said rims and adapted to enter the said notch, and a bridge piece provided at its opposite ends with spring fingers which are connected respectively to the adjacent ends of the said rims.

In testimony that I claim the foregoing as my invention I have hereunto signed my name this 4th day of March, A. D. 1903.

IVAN FOX.

In presence of—
THOS. K. LANCASTER,
LAURA KLEINFELDER.